US007497152B2

(12) United States Patent
Zeiler et al.

(10) Patent No.: US 7,497,152 B2
(45) Date of Patent: Mar. 3, 2009

(54) MOVABLE HANDLE FOR A POWER TOOL

(75) Inventors: Jeffrey Michael Zeiler, Pewaukee, WI (US); Scott George Ahlswede, Plymouth, WI (US); Richard Paul Brault, Cedarburg, WI (US); Jeffrey Scott Holly, Menomonee Falls, WI (US); Jeffrey Charles Hessenberger, Neosho, WI (US); Thomas Paul James, Oconomowoc, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 11/339,450

(22) Filed: Jan. 24, 2006

(65) Prior Publication Data

US 2006/0117921 A1 Jun. 8, 2006

Related U.S. Application Data

(60) Continuation of application No. 11/322,459, filed on Dec. 30, 2005, now abandoned, and a continuation of application No. 11/297,898, filed on Dec. 9, 2005, now abandoned, and a division of application No. 10/614, 528, filed on Jul. 7, 2003, now Pat. No. 7,096,588, which is a continuation of application No. 09/940,222, filed on Aug. 27, 2001, now Pat. No. 6,588,112, which is a division of application No. 09/618,217, filed on Jul. 18, 2000, now Pat. No. 6,301,790, which is a continuation of application No. 09/134,626, filed on Aug. 14, 1998, now Pat. No. 6,108,916.

(51) Int. Cl.
*B23D 45/16* (2006.01)

(52) U.S. Cl. .............................. 83/13; 30/388; 30/391; 30/375; 83/34; 83/56

(58) Field of Classification Search .................. 16/422, 16/900, 110.1, 406, 408, 419, DIG. 25; 81/3.43, 81/60, 64; 30/340, 260, 519, 122, 164.9, 30/319, 388–391, 191, 514, 517, 211, 276, 30/166.3, 375–377; 408/15; 45/340; 173/170; 56/DIG. 18; 83/399, 400, 34, 56, 13

See application file for complete search history.

(56) References Cited

U.S. PATENT DOCUMENTS

D37,730 S 12/1905 Wheelock (Continued)

FOREIGN PATENT DOCUMENTS

DE 412 773 4/1925

(Continued)

OTHER PUBLICATIONS

Makita Instruction Manual for Cordless Recipro Saw Model 4390D and Model 4390DW With Fast Charger, Feb. 19, 1991.

* cited by examiner

*Primary Examiner*—Boyer D. Ashley
*Assistant Examiner*—Laura M. Lee
(74) *Attorney, Agent, or Firm*—Michael Best & Friedrich LLP

(57) ABSTRACT

A movable handle and a power tool. The power tool comprises a housing, a motor supported by-the housing and operable to drive a tool element about an axis, and a handle supported by the housing for rotation relative to the housing about the axis. Preferably, the power tool is a circular saw. The circular saw further comprises a switch assembly supported on the handle for movement with the handle and means for connecting the switch to the motor to accommodate movement of the switch relative to the motor. The switch assembly is electrically connectable to the motor and selectively connects the motor to a power source, and the connecting means includes a wiring arrangement. The circular saw further comprises a locking assembly for locking the handle in a position relative to the housing. Also, the circular saw preferably comprises means for preventing the switch assembly from connecting the motor to the power source when the locking assembly is in the unlocked condition and means for preventing the locking assembly from being operated from the locked condition to the unlocked condition when the switch assembly is in the operated condition.

31 Claims, 7 Drawing Sheets

U.S. PATENT DOCUMENTS 1,217,521 A 2/1917 Snyder
1,281,214 A 10/1918 Packwood
1,406,071 A 2/1922 Pavelka
1,793,053 A 2/1931 Cahill et al.
1,978,369 A 10/1934 Levin
2,293,859 A 8/1942 Scott
2,337,769 A 12/1943 Redenbo
2,348,266 A 5/1944 Selby
2,414,637 A 1/1947 Crump
2,430,422 A 11/1947 Happe
2,436,692 A 2/1948 Greene
2,619,132 A 11/1952 Pierce
2,630,148 A 3/1953 Ferguson
2,659,399 A * 11/1953 Doug .......................... 30/391
2,668,567 A 2/1954 Olson
2,737,985 A 3/1956 Utz
2,781,800 A 2/1957 Papworth
2,783,790 A 3/1957 Keesling
2,793,661 A 5/1957 Olson
2,822,005 A 2/1958 Lee et al.
2,879,815 A 3/1959 Papworth
2,946,358 A 7/1960 Bruck
2,961,016 A 11/1960 Papworth
2,984,757 A 5/1961 Papworth
3,028,890 A 4/1962 Atkinson et al.
3,044,171 A 7/1962 Cecere
3,322,170 A 5/1967 Persson
3,580,342 A 5/1971 Matthews
3,602,052 A 8/1971 Frost
3,694,855 A * 10/1972 Meyer et al. .................. 16/437
3,768,359 A 10/1973 Koefferlein
3,785,053 A 1/1974 Michaelson
3,795,168 A 3/1974 Spachner et al.
3,848,647 A 11/1974 Fell
3,876,015 A 4/1975 Kivela
3,923,126 A 12/1975 Bidanset
3,945,120 A 3/1976 Ritz
4,036,089 A 7/1977 Criblez
4,137,632 A 2/1979 Pfanzer
4,216,631 A 8/1980 Ryer, II
4,238,884 A 12/1980 Walton, II
4,240,204 A 12/1980 Walton, II et al.
4,245,390 A 1/1981 Bond
4,255,858 A 3/1981 Getts
4,262,564 A 4/1981 Kaltenbach
4,276,675 A 7/1981 Pioch
4,287,800 A 9/1981 Persson
4,368,598 A 1/1983 Kuhlmann
4,462,282 A 7/1984 Biek
4,516,324 A 5/1985 Heininger, Jr. et al.
4,522,270 A 6/1985 Kishi
4,522,276 A 6/1985 Fogg et al.
4,570,500 A 2/1986 Richter
4,685,214 A 8/1987 Shearon et al.
4,693,008 A 9/1987 Velie
4,785,540 A 11/1988 Arvidsson
4,856,394 A 8/1989 Clowers
4,870,758 A 10/1989 Fushiya
4,912,348 A 3/1990 Maki et al.
4,912,349 A 3/1990 Chang
4,947,908 A 8/1990 O'Banion et al.
4,976,173 A 12/1990 Yang
4,982,501 A 1/1991 Sauerwein et al.
4,984,369 A 1/1991 Flint et al.
4,991,298 A 2/1991 Matre
4,998,353 A 3/1991 Fukuda et al.
D315,854 S 4/1991 Kawakami et al.
5,005,295 A 4/1991 Fushiya
5,007,172 A 4/1991 Palm
5,044,568 A 9/1991 Shigemizu
5,058,470 A 10/1991 Fröhlich
5,062,179 A * 11/1991 Huang ......................... 16/436
5,065,476 A 11/1991 Dohse et al.
5,070,576 A 12/1991 Banta
5,075,976 A 12/1991 Young
D323,274 S 1/1992 Sasaki et al.
5,079,844 A 1/1992 Palm
5,083,376 A 1/1992 Lentino
5,089,738 A 2/1992 Bergqvist et al.
5,129,300 A 7/1992 Kawakami
5,134,777 A 8/1992 Meyer et al.
5,170,532 A 12/1992 Holmin et al.
5,193,281 A 3/1993 Kasten
5,201,146 A 4/1993 Fushiya
5,205,043 A 4/1993 Batt et al.
D335,433 S 5/1993 Schultz et al.
5,311,949 A 5/1994 Chapin
5,327,648 A 7/1994 Ullmann
5,339,572 A 8/1994 Eicher
5,347,902 A 9/1994 Brickner et al.
5,374,809 A 12/1994 Fox et al.
5,375,666 A 12/1994 Pettet et al.
5,394,592 A 3/1995 Quick
5,407,381 A 4/1995 Schaefer et al.
5,463,918 A 11/1995 Lemieux et al.
5,466,183 A 11/1995 Kirn et al.
5,475,927 A 12/1995 Dorma
5,533,581 A 7/1996 Barth et al.
5,561,907 A 10/1996 Campbell et al.
D376,083 S 12/1996 Verdura et al.
D377,303 S 1/1997 Nagel
5,595,250 A 1/1997 Bourke
5,598,636 A 2/1997 Stolzer
5,640,741 A 6/1997 Yano
D380,658 S 7/1997 Bruno et al.
D382,458 S 8/1997 Hogue et al.
5,681,214 A 10/1997 Kleider et al.
D386,658 S 11/1997 Jansson et al.
5,687,483 A 11/1997 Neubert et al.
5,687,802 A 11/1997 Spooner et al.
5,697,158 A 12/1997 Klinzing et al.
5,725,422 A * 3/1998 Leweck ...................... 451/359
D393,194 S 4/1998 Hogue et al.
5,755,293 A 5/1998 Bourke
D396,175 S 7/1998 Chung
5,778,649 A 7/1998 Losdahl et al.
5,782,000 A 7/1998 Bednar
D401,128 S 11/1998 Zurwelle
5,832,611 A 11/1998 Schmitz
5,853,273 A 12/1998 Coffey
5,855,067 A * 1/1999 Taomo et al. ................. 30/122
5,855,070 A 1/1999 Grabowski
5,856,715 A 1/1999 Peot et al.
5,870,938 A * 2/1999 Brunson et al. ............ 83/471.3
D408,699 S 4/1999 Zurwelle
5,913,645 A 6/1999 Coffey
5,924,497 A 7/1999 Spooner et al.
5,940,977 A 8/1999 Moores, Jr.
5,942,975 A 8/1999 Sorensen
5,984,020 A 11/1999 Meyer et al.
6,044,559 A 4/2000 Holst
D424,902 S 5/2000 Gildersleeve et al.
D428,787 S 8/2000 Smolinski et al.
6,098,492 A * 8/2000 Juchniewicz et al. ....... 74/551.3
6,108,867 A 8/2000 Nagashima
6,138,364 A 10/2000 Schmitz
D433,907 S 11/2000 Fuchs et al.
D436,011 S 1/2001 Fuchs et al.
6,266,850 B1 7/2001 Williams et al.
D447,924 S 9/2001 Neitzell et al.

FOREIGN PATENT DOCUMENTS

DE 803 013 2/1951

| | | |
|---|---|---|
| DE | 74 42 904 | 9/1975 |
| DE | 79 04 242 | 7/1980 |
| DE | 38 28 785 | 4/1989 |
| DE | 38 25 477 | 2/1990 |
| DE | 40 21 277 | 3/1991 |
| DE | 41 03 809 | 8/1991 |
| DE | 41 02 421 | 7/1992 |
| DE | 41 02 838 | 8/1992 |
| DE | 41 16 343 | 11/1992 |
| DE | 93 19 263 | 3/1994 |
| DE | 44 06 718 | 8/1995 |
| EP | 0 072 282 | 2/1983 |
| EP | 0 125 101 | 11/1984 |
| EP | 0 267 472 | 5/1988 |
| EP | 0 422 773 | 4/1991 |
| EP | 0 561 473 | 9/1993 |
| EP | 0 768 138 | 4/1997 |
| EP | 0 936 032 | 8/1999 |
| EP | 1 313 180 | 5/2003 |
| GB | 2 026 928 | 2/1980 |
| JP | 10-166283 | 6/1998 |
| WO | WO 92/05003 | 4/1992 |
| WO | WO 92/12823 | 8/1992 |
| WO | WO 92/12824 | 8/1992 |
| WO | WO 92/12825 | 8/1992 |
| WO | WO 92/20491 | 11/1992 |
| WO | WO 94/00264 | 1/1994 |

MOVABLE HANDLE FOR A POWER TOOL

RELATED APPLICATIONS

This is a continuation of patent application Ser. No. 11/322,459, filed Dec. 30, 2005 now abandoned and of patent application Ser. No. 11/297,898, filed Dec. 9, 2005 now abandoned, and is a divisional of patent application Ser. No. 10/614,528, filed Jul. 7, 2003, now U.S. Pat. No. 7,096,588 which is a continuation of patent application Ser. No. 09/940,222, filed Aug. 27, 2001, now U.S. Pat. No. 6,588,112, issued Jul. 8, 2003, which is a division of patent application Ser. No. 09/618,217, filed Jul. 18, 2000, now U.S. Pat. No. 6,301,790, issued Oct. 16, 2001, which is a continuation of patent application Ser. No. 09/134,626, filed Aug. 14, 1998, now U.S. Pat. No. 6,108,916, issued Aug. 29, 2000, the entire contents of all of which are hereby incorporated by reference.

This application is related to co-pending patent application Ser. No. 11/338,235, filed Jan. 24, 2006; to co-pending patent application Ser. No. 11/322,457, filed Dec. 30, 2005; and to co-pending patent application Ser. No. 11/297,899, filed Dec. 9, 2005; the entire contents of all of which are hereby incorporated by reference.

FIELD OF THE INVENTION

The present invention relates to power tools and, more particularly, to a handle arrangement for power tools.

BACKGROUND OF THE INVENTION

A power tool, such as a circular saw, generally includes a housing supporting a motor which rotatably drives a tool element, such as a saw blade. Typically, an operator's handle is integrally formed with the housing. In a circular saw, a shoe plate supports the saw on the surface of a workpiece.

In some circular saws, the housing is adjustable relative to the shoe plate to change the depth of cut of the saw blade. For example, the housing may pivot relative to the shoe plate about an axis adjacent the front of the shoe plate (front pivot depth adjustment) or about an axis adjacent the rear of the shoe plate (rear pivot depth adjustment). In another construction, the shoe plate is slidably lowered and raised relative to the housing (drop shoe depth adjustment). In each of these depth adjustment arrangements, when the depth of cut of the saw blade is adjusted, the position and/or orientation of the handle relative to the workpiece is also adjusted.

U.S. Pat. No. 4,516,324 discloses a modular housing system for a circular saw. The circular saw includes a single, one-piece housing having an interface portion which interchangeably mounts either a pivot adjust subassembly or a vertical (drop shoe) adjust subassembly for changing the depth of cut of the circular saw. The main handle can have either a "push handle" configuration or a "top handle" configuration. The selected handle component is slipped onto the one-piece field case and secured by fasteners.

SUMMARY OF THE INVENTION

One independent problem with a circular saw including an operator's handle that is integrally formed with the housing, is that, in some cutting operations, the operator may prefer a "push handle" to a "top handle" or vice versa. However, the operator cannot adjust the handle to the desired position relative to the housing.

Another independent problem with a circular saw with an integral handle is that, when the depth of cut of the saw blade is adjusted, the handle position and orientation also changes.

The resulting handle position is often uncomfortable and is seldom the optimal position for operation of the circular saw.

For example, in a circular saw with a front pivot depth adjustment assembly, at full depth of cut, the handle is typically positioned as a "push handle". At a minimum depth of cut, the handle position is changed to a "top handle" position. In a circular saw with a rear pivot depth adjustment assembly, at full depth of cut, the handle must be oriented above a typical "push handle" position because, when the saw is adjusted to a minimum depth of cut, the handle is lowered.

One independent problem with the handle arrangement disclosed in U.S. Pat. No. 4,516,324 is that the circular saw includes two separate handles. The handle component that is not in use must be stored and may be lost or damaged.

Another independent problem with the handle arrangement disclosed in U.S. Pat. No. 4,516,324 is that the saw includes a handle that is only a "push handle" or a "top handle" and that is not adjustable between these configurations. Additional fasteners are also required.

The present invention provides a handle arrangement for a power tool that alleviates the one or more of the above-described and other independent problems with the above-described handle arrangements. In some aspects, the invention provides a power tool, such as a circular saw, that generally includes a handle that is movable relative to the motor housing. Preferably, the handle is pivotable about the axis of the saw blade relative to the motor housing.

Also, in some aspects, the invention provides a locking assembly for locking the handle in a position relative to the housing. Preferably, the locking assembly provides a frictional engagement between the handle and the housing and includes a clamping member that releasably applies a clamping force to the housing to lock the handle in a position relative to the housing. Preferably, the locking assembly also provides a positive engagement between the handle and the housing and includes inter-engaging teeth formed on both the handle and the housing.

Further, in some aspects, the invention provides means for connecting the switch to the motor to accommodate movement of the switch with the handle and relative to the motor. Preferably, the connecting means are provided by a wiring arrangement.

In addition, in some aspects, the invention provides interaction between the switch and the locking assembly to prevent inadvertent operation of one when the other is operated. Specifically, the switch preferably cannot be operated when the locking assembly is unlocked, and the locking assembly cannot be unlocked when the switch is connecting the motor to the power source.

One independent advantage of the present invention is that the handle is movable relative to the housing of the power tool to allow the operator to position the handle as desired for a given cutting operation. As a result, the operator can adjust the handle to a position that is most comfortable and allows the greatest control of the circular saw during cutting operations.

Another independent advantage of the present invention is that, when the circular saw is adjusted to change the depth of cut of the saw blade, the operator can also adjust the handle to an optimum position for the given cutting operation.

Yet another independent advantage of the present invention is that the circular saw does not include additional components that must be substituted for one another to change the configuration of the handle or additional fasteners. This reduces the chance that such an additional component is lost or damaged and also eliminates the need to store additional components.

A further independent advantage of the present invention is that the handle is adjustable to substantially any position between a first position, such as a "push handle" position, and a second position, such as a "top handle" position.

Other independent features and independent advantages of the invention will become apparent to those skilled in the art upon review of the following detailed description, claims and drawings.

Figure 1A:
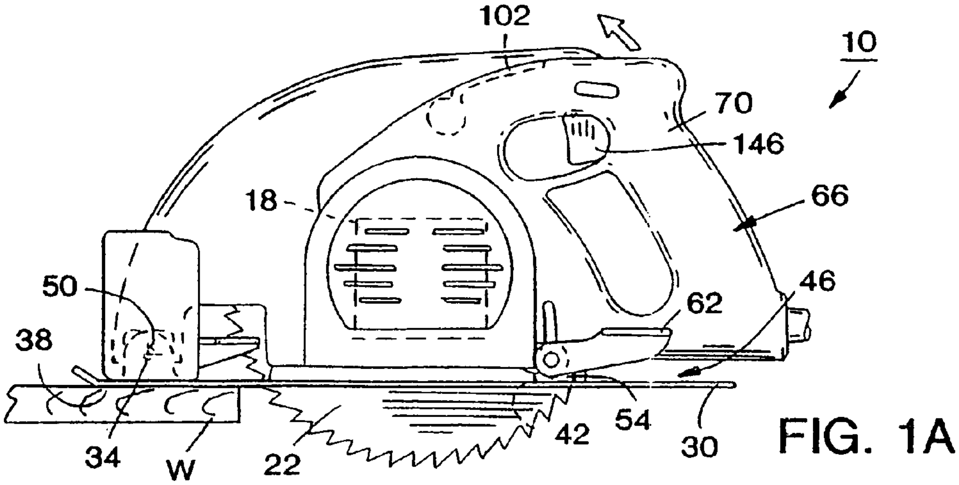
FIGS. 1A, 1B and 1C are side views of a power tool embodying the invention and illustrating the adjustment of the handle arrangement.

Before at least one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION

A power tool embodying aspects of the invention is illustrated in FIG. 1A. In the illustrated construction, the power tool is a circular saw 10 and includes a motor housing 14 supporting an electric motor 18 (shown schematically in FIG. 1A). The motor 18 is connectable to a power source and is operable to rotatably drive a tool element, such as a saw blade 22, about an axis 26 to cut a workpiece W.

Figure 1B:
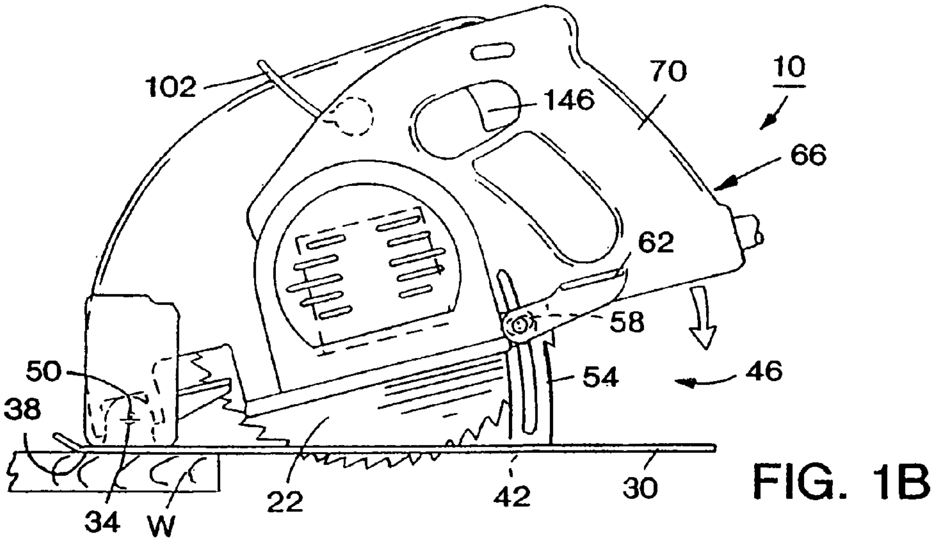
Figure 1C:
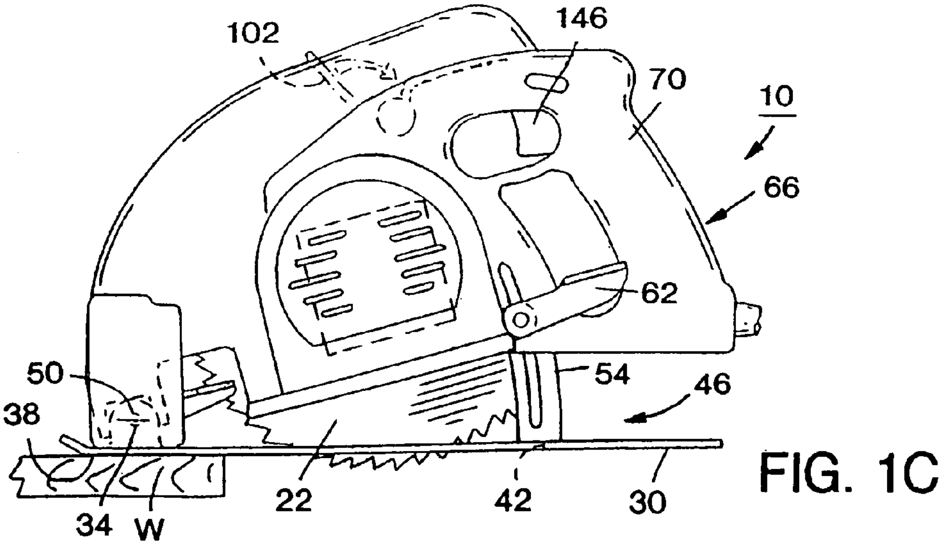

The circular saw 10 also includes (see FIGS. 1A-1C) a shoe plate 30 connected to the housing 14 for pivotal movement about a pivot axis 34. The shoe plate 30 has a support surface 38 for supporting the circular saw 10 on the surface of the workpiece W. An aperture 42 is defined by the shoe plate 30. A portion of the saw blade 22 extends through the aperture 42 to cut the workpiece W. FIG. 1A illustrates the shoe plate 30 adjusted so that the saw blade 22 is at a maximum depth of cut. FIGS. 1B and 1C illustrate the shoe plate 30 adjusted so that the saw blade 22 is at a minimum depth of cut.

In the illustrated construction, the circular saw 10 includes a front pivot depth adjustment assembly 46 to adjust the depth of cut of the saw blade 22. The depth adjustment assembly 46 includes a pivot member 50 defining the pivot axis 34 and pivotally connecting the shoe plate 30 to the housing 14. As shown in FIG. 1B, a guide member 54 cooperates with a depth adjustment locking member 58 (shown in phantom) to lock the shoe plate 30 in a pivoted position relative to the housing 14 thereby fixing the depth of cut of the saw blade 22. A depth adjustment lever 62 operates the locking member 58 between locked and unlocked positions.

In other constructions (not shown), the circular saw 10 may include, for example, a rear pivot depth adjustment assembly or a drop shoe depth adjustment assembly rather than the front pivot depth adjustment assembly 46. It should be understood that the present invention applies to a circular saw with any type of depth adjustment assembly.

The circular saw 10 also includes (see FIGS. 2-6) a movable handle arrangement 66. The movable handle arrangement 66 includes a main operator's handle member 70 movably supported on a support portion 72 of the housing 14 so that the position of the handle member 70 is adjustable relative to the housing 14. Further, with the depth adjustment assembly 46 locked and the saw blade 22 at a desired depth of cut, the handle member 70 is adjustable relative to the shoe plate 30 and relative to the surface of the workpiece W (as shown in the change of position between FIGS. 1B and 1C).

In the illustrated construction, the handle member 70 has (see FIGS. 4-6) opposite handle halves 74 and a rearward grip member 78. Further, in the illustrated construction, the handle member 70 is supported to be pivotable about the axis 26 of the saw blade 22 relative to the housing 14. However, in other constructions (not shown), the handle member 70 may be pivotable about an axis that is generally parallel to the axis 26. Also, in yet other constructions (not shown), the handle member 70 may be slidable along an axis normal to the axis 26 relative to the housing 14.

The circular saw 10 also includes (see FIGS. 3-7) a locking assembly 82 to fix the handle member 70 on the support portion 72 of the housing 14 in a pivoted position relative to the housing 14. As explained in more detail below, the locking assembly 82 is operable between a locked condition (shown in FIGS. 4 and 6), in which the handle member 70 is fixed in a position relative to the housing 14, and an unlocked condition (shown in FIG. 5), in which the position of the handle member 70 relative to the housing 14 is adjustable.

Figure 3:
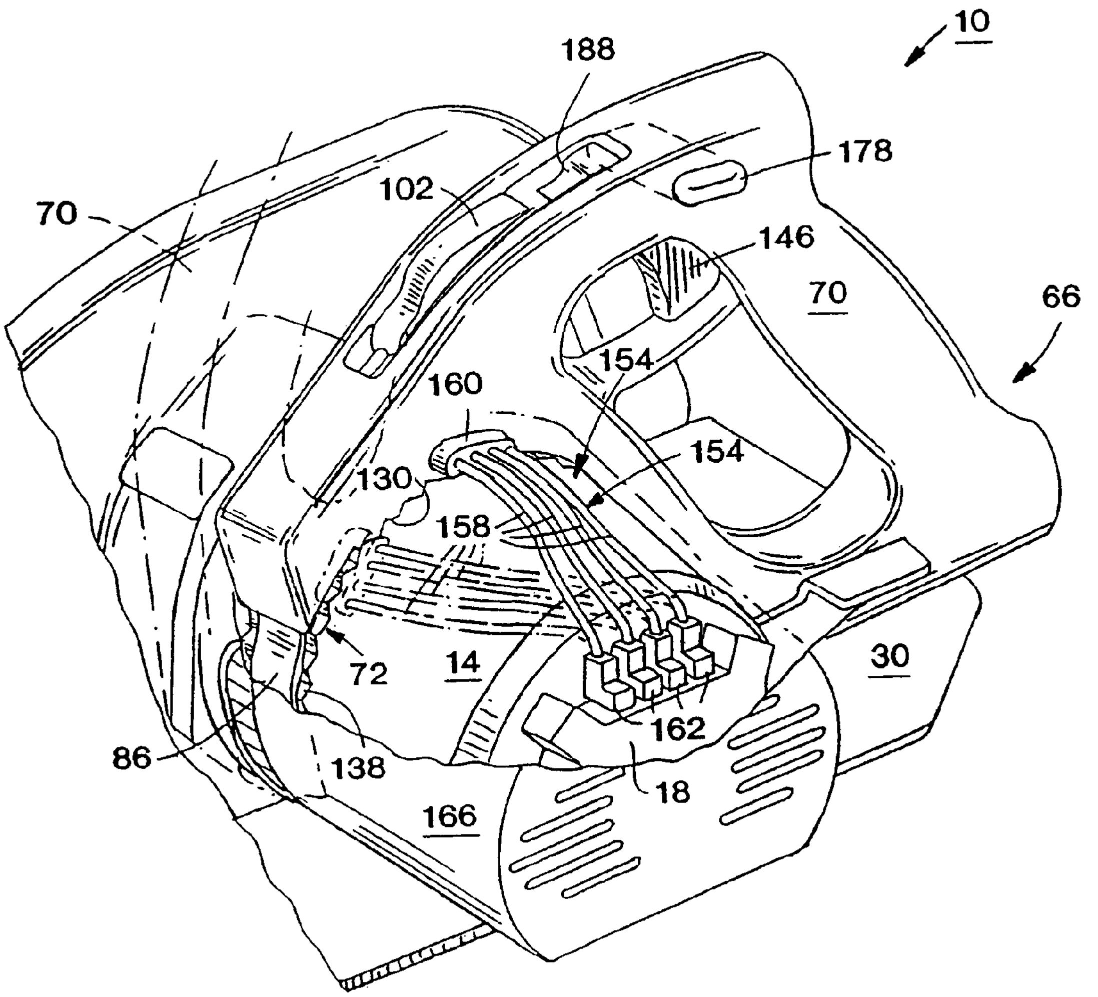
FIG. 3 is an enlarged perspective view of a portion of the power tool shown in FIG. 2 with portions cut away.
Figure 4:
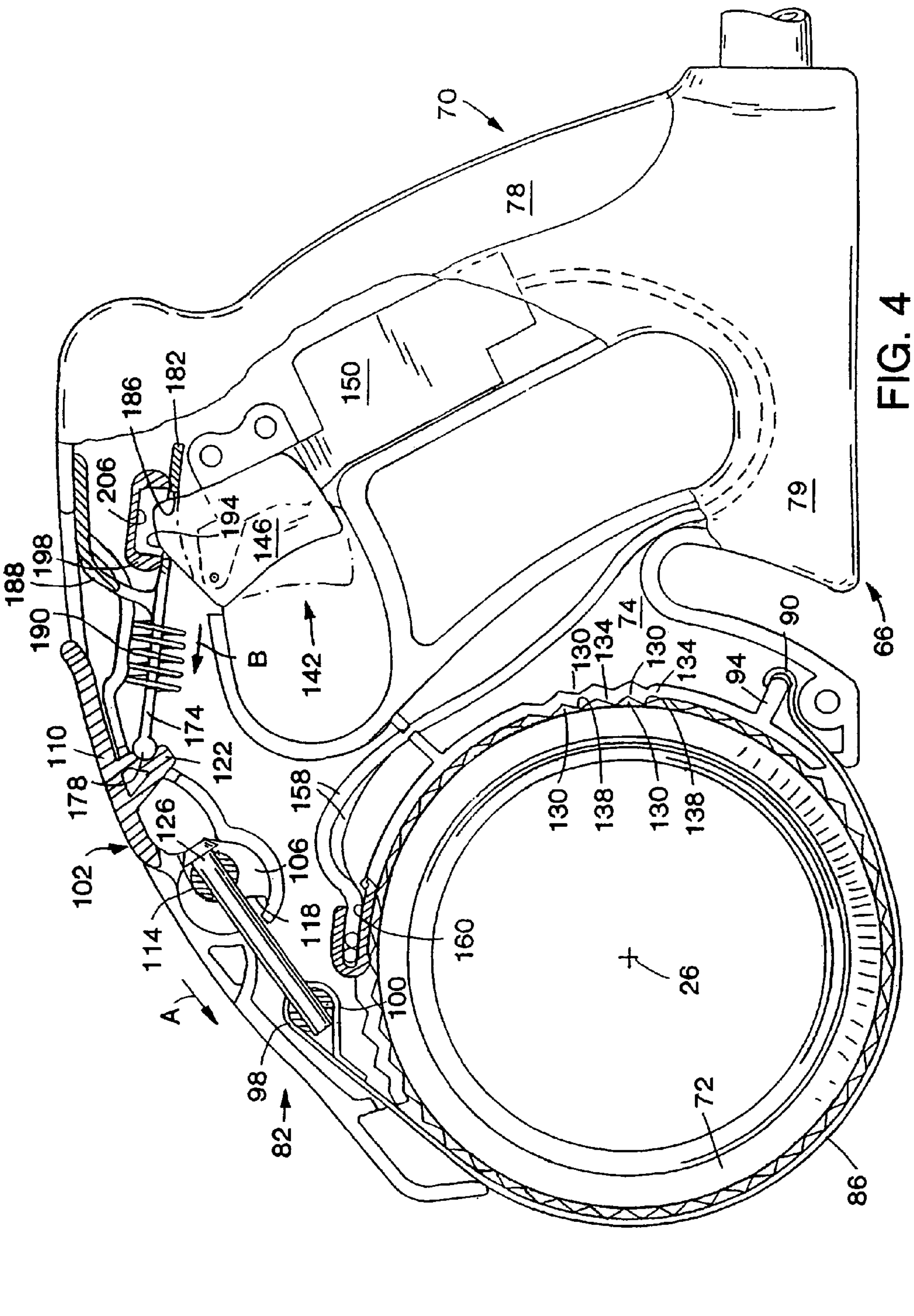
FIG. 4 is a side partial cross-sectional view of the handle arrangement shown in FIG. 3.
Figure 5:
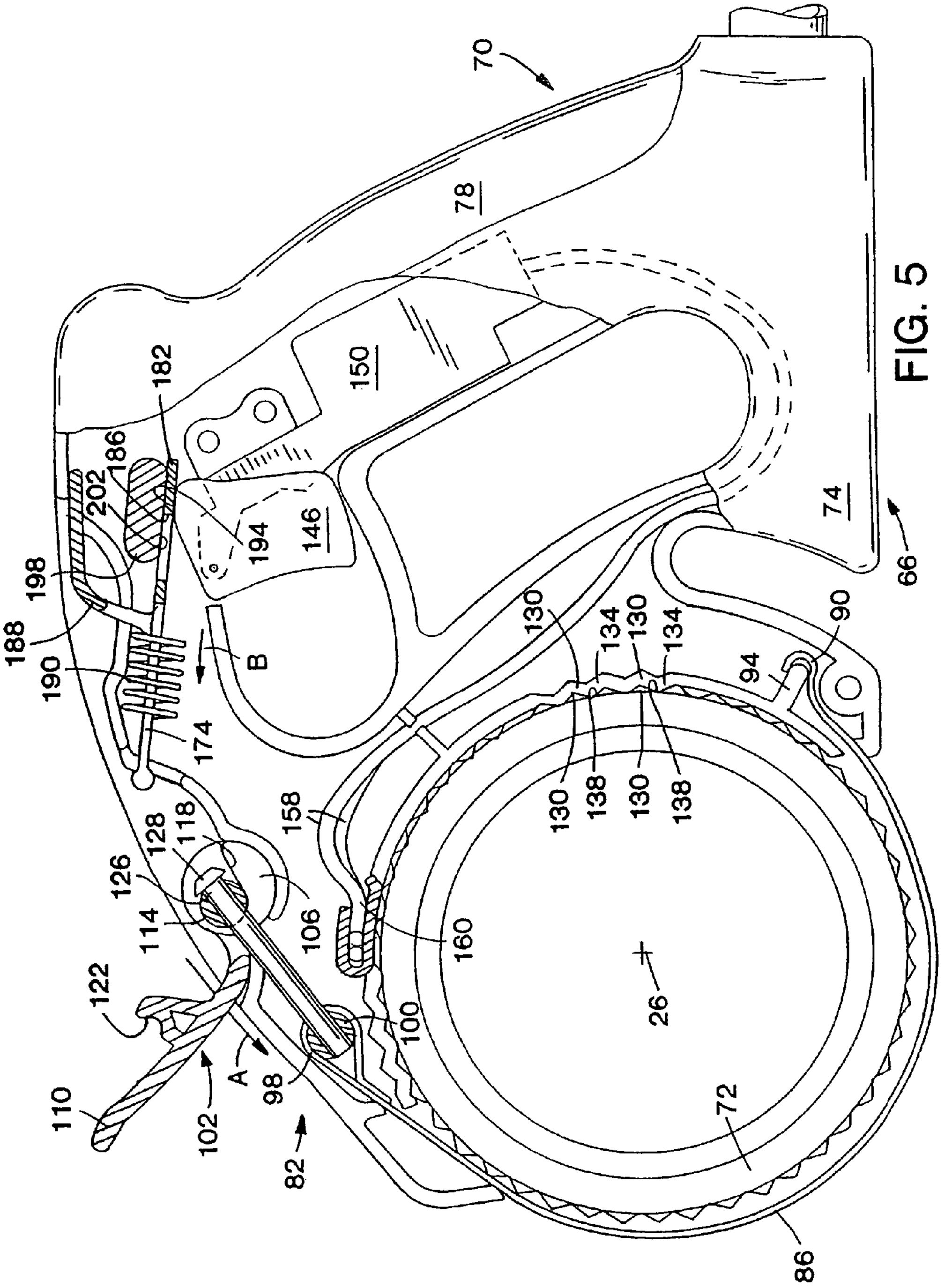
FIG. 5 is a view similar to that shown in FIG. 4 and illustrating the locking assembly in an unlocked condition.

The locking assembly 82 includes (see FIGS. 3-7) a locking member 86 which, in the illustrated construction, is a clamping band movably supported on the handle member 70 to releasably apply a clamping force to the support portion 72 of the housing 14. As shown in FIGS. 4 and 5, one end 90 of the locking member 86 is fixed to a stud 94 formed on the handle member 70. The other end 98 of the locking member 86 supports a through pin 100 and is movably connected to the handle member 70, as explained in more detail below. The handle member 70 and the locking member 86 are connected about the support portion 72 of the housing 14.

The locking assembly 82 also includes (see FIGS. 3-7) an actuating member 102 for moving the locking member 86 between a locked position and an unlocked position corresponding to the locked condition and the unlocked condition, respectively, of the locking assembly 82. The actuating member 102 is pivotably supported on the handle member 70 and includes a cam-shaped portion 106 and a lever portion 110. A tapped pin 114 is supported off-center in the cam-shaped portion 106, and an annular opening 118 is formed in the cam-shaped portion 106. A tab 122 extends from the lower surface of the lever portion 110.

To movably connect the end 98 of the locking member 86 to the handle member 70, the locking assembly 82 also includes a threaded pin 126 which engages the through pin 100 connected to the end 98 of the locking member 86. The threaded pin 126 also extends through the tapped pin 114 supported in the cam-shaped portion 106 of the actuating member 102. The annular opening 118 accommodates pivoting movement of the actuating member 102 relative to the threaded pin 126.

To move the locking member 86 between the locked and unlocked positions, the actuating member 102 is pivoted, moving the threaded pin 126 and the end 98 of the locking member 86. As the actuating member 102 is moved from the locked position (shown in FIG. 4) to the unlocked position (shown in FIG. 5), the threaded pin 126 is moved in the direction of arrow A. The locking member 86 is thus moved to the unlocked position (as shown in FIG. 5) and does not apply a clamping force to the support portion 72 to fix the handle member 70 in position relative to the housing 14.

To move the locking member 86 to the locked position, the actuating member 102 is moved from the unlocked position (shown in FIG. 5) to the locked position (shown in FIG. 4) causing the threaded pin 126 to be in the direction opposite to arrow A. The locking member 86 is thus moved to the locked position (shown in FIG. 4) and applies a clamping force to the support portion 72 of the housing 14.

In the unlocked position (shown in FIG. 5), the threaded pin 126 is adjustable to change the clamping force applied by the locking member 86 when the locking member 86 is in the locked position. With the actuating member 102 in the unlocked position, the exposed end 128 of the threaded pin 126 is accessible by the operator to threadably loosen or tighten the locking member 86. This adjustment of the locking member 86 may be necessary due to manufacturing tolerances or may become necessary due to wear of the movable handle arrangement 66.

The locking assembly 82 also includes (see FIGS. 3-5) inter-engaging teeth 130 formed on the support portion 72 of the housing 14 and on the handle member 70. The inter-engaging teeth 130 provide a plurality of complementary locking projections 134 and locking recesses 138 formed on the support portion 72 of the housing 14 and on the handle member 70. As shown in FIG. 3, the clamping force applied by the locking member 86 to the housing 14 causes close engagement of the inter-engaging teeth 130. As shown in FIG. 5, release of the clamping force allows the inter-engaging teeth 130 to be disengaged and moved relative to each other.

In the preferred embodiment, the locking assembly 82 provides both a frictional engagement, through the clamping force applied by locking member 86 to the support portion 72 of the housing 14, and a positive engagement, through the inter-engaging teeth 130. In other constructions (not shown), however, the locking assembly 82 may only provide either a frictional engagement or a positive engagement.

For example, the locking assembly 82 may include only the frictional engagement provided by a locking member, similar to the locking member 86, applying a clamping force to the support portion of the housing 14. Alternatively, the locking assembly 82 may provide only the positive engagement, such as by a locking projection that is engageable with a locking recess to fix the handle member 70 in a position relative to the housing 14. Such a positive engagement could be provided by a detent assembly between the handle member 70 and the support portion 72 of the housing 14 with locking recesses corresponding to respective positions of the handle member 70 relative to the housing 14.

The circular saw 10 also includes (see FIGS. 3-7) a switch assembly 142 for selectively connecting the motor 18 to the power source to energize the motor 18. The switch assembly 142 is operable between an unoperated condition, in which the motor 18 is not connected to the power source, and an operated condition, in which the motor 18 is connected to the power source. The switch assembly 142 includes a depressable trigger 146 connected to an on/off switch 150. In the illustrated construction, the trigger 146 and the switch 150 are mounted for movement with the handle member 70 and relative to the motor 18.

The circular saw 10 also includes means for connecting the switch 150 to the motor 18. The connecting means accommodates movement of the switch 150 relative to the motor 18 so that, in any position of the handle member 70 relative to the housing 14, the switch 150 is operable to selectively connect the motor 18 to the power source.

In the illustrated construction, the connecting means includes a wiring arrangement 154 (see FIGS. 3-5) to electrically connected the switch 150 to the motor 18. The wiring arrangement 154 includes wires 158 extending through a narrow opening 160 in the handle member 70 and connected to the motor 18 by respective connectors 162. The wiring arrangement 154 includes an amount of wire 158 sufficient to accommodate movement of the switch 150 to the extreme pivoted positions (shown in solid and phantom lines in FIG. 3) of the handle member 70 relative to the housing 14. The narrow opening 160 limits the movement of one end of the wires 158 thereby locating the wires 158 during movement of the handle member 70. The connectors 162 limit the movement of other end of wires 158.

In another construction (not shown), the connecting means may include a fixed first conductor mounted on the housing 14 and electrically connected to the motor 18. The first conductor extends along the path of movement of the handle member 70. In this construction, the connecting means also includes a movable second conductor fixed to the handle member 70 and electrically connected to the switch 150. The second conductor is movably connected to the first conductor and moves along the first conductor to thereby maintain the electrical connection between the switch 150 and the motor 18 at any position of the handle member 70 relative to the housing 14.

In yet another construction (not shown), the connecting means may include a remote transmitter and sensor combination to connect the switch 150 to the motor 18. In this construction, the transmitter is fixed to and moves with the handle member 70. The transmitter transmits a signal based on the condition of the switch 150, for example, an “ON” signal or an “OFF” signal. The sensor or receiver is mounted on the housing 14 and electrically connected to the motor 18. The sensor senses the transmitted signal and, if, for example, the “ON” signal is transmitted, connects the motor 18 to the power source. In this construction, the power source is directly connectable to the motor 18, rather than being connected through the switch 150.

A cover 166 is positioned over the motor 18 and the connecting means. In the illustrated construction, the cover 166 includes a channel 170 that accommodates movement of the wires 156 between the extreme pivoted positions (shown in solid and phantom lines in FIG. 3). The channel 170 also insures that the wiring arrangement 154 is protected and not damaged during movement of the handle member 70 relative to the housing 14.

The circular saw 10 also includes (see FIGS. 4-7) means for preventing the switch assembly 142 from connecting the motor 18 to the power source when the locking assembly 82 is in the unlocked condition. Further, the circular saw 10 includes means for preventing the locking assembly 82 from being operated from the locked condition to the unlocked condition when the switch assembly 142 is in the operated condition. The locking assembly 82 and the switch assembly 142 interact to prevent unintentional operation of one assembly when the other assembly is being operated.

The preventing means are provided by a locking plate 174 which interacts with both the locking assembly 82 and the switch assembly 142. The locking plate 174 includes an end 178 for engagement with the tab 122 of the actuating member 102. At the other end, the locking plate 174 includes a blocking portion 182 and an aperture 186. A depressable button 188 is connected to the locking plate 174. The button 188 includes an elongated portion to provide a debris barrier. A spring member 190 biases the locking plate 174 toward engagement with the actuating member 102 (in the direction of arrow B in FIGS. 4 and 5).

As shown in FIG. 5, with the locking assembly 82 in the unlocked condition, the locking plate 174 is moved by the spring member 190 in the direction of arrow B to a position in which the blocking portion 182 engages an upper portion 194 of the trigger 146. In this position, movement of the trigger 146 is prevented, thereby preventing the switch 150 from connecting the motor 18 to the power source.

During movement of the actuating member 102 to the locked position, the tab 122 engages the end 178 and moves the locking plate 174 in the direction opposite to arrow B. Alternatively, the operator depresses the button 188 to move the locking plate 174. Once the actuating member 102 is in the locked position, the end 178 engages in the recess formed on the tab 122.

As shown in FIG. 4, with the locking assembly 82 in the locked condition, the locking plate 174 is in a position in which the upper portion 194 of the trigger 146 is movable into the aperture 186. In this position, the locking plate 174 does not block movement of the trigger 146 and does not prevent the switch 150 from connecting the motor 18 to the power source.

In order to move the actuating member 102 to the unlocked position, the locking plate 174 must be moved in the direction opposite to arrow B. To move the locking plate 174, the operator depresses the button 188, disengaging the end 178 from recess formed on the tab 122. In the illustrated construction, the actuating member 102 cannot be moved to the unlocked position without the operator depressing the button 188. This reduces the likelihood that the actuating member 102 can be accidentally moved to the unlocked position and that the locking assembly 82 can be accidentally released.

In another construction (not shown), the locking plate 174 does not include the button 188. An unlocking force applied by the operator to move the actuating member 102 to the unlocked position causes the tab 122 to move the locking plate 174 in the direction opposite to arrow B. In such a construction, the configuration of the tab 122 would ensure that the required unlocking force is much greater than a force that would be applied if, for example, the operator accidentally pulled on the actuating member 102. This construction also reduces the likelihood of the locking assembly 82 being accidentally unlocked.

In either construction, however, when the trigger 146 is depressed (as shown in solid lines in FIG. 4), the upper portion 194 of the trigger 146 engages the forward wall of the aperture 186, and the locking plate 174 is prevented from moving in the direction opposite to arrow B. Thus, the locking plate 174 provides a means for preventing the locking assembly 82 from being moved from the locked condition to the unlocked condition when the switch assembly 142 is in the operated condition.

With the trigger in the unoperated condition (as shown in phantom lines in FIG. 4), the upper portion 194 of the trigger 146 does not engage the forward wall of the aperture 186. The locking plate 174 can be moved in the direction opposite to arrow B, and the actuating member 102 can be moved to the unlocked position (shown in FIG. 5).

In other constructions (not shown), the preventing means may be provided by other mechanical interaction between the locking assembly 82 and the switch assembly 142. For example, the preventing means may be provided by direct interaction (not shown) between the trigger 146 and the actuating member 102 without an additional component such as the locking plate 174.

In yet other constructions, the preventing means may be provided by non-mechanical means, such as by additional electrical switches which must be operated to enable operation of the locking assembly 82 and/or the switch assembly 142. For example, the locking assembly 82 can include a switch (not shown) electrically connected to the switch 150. This additional switch would prevent the switch 150 from connecting the motor 18 to the power source when the locking assembly 82 is in the unlocked condition.

Figure 8A:
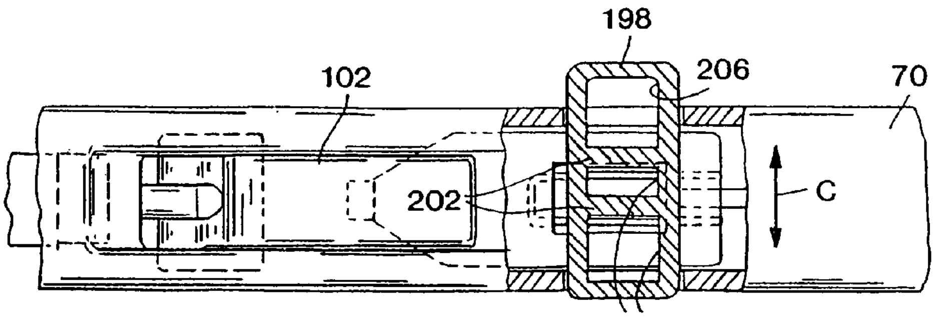
FIG. 8A is a view taken generally along line 8A-8A in FIG. 6.
Figure 8B:
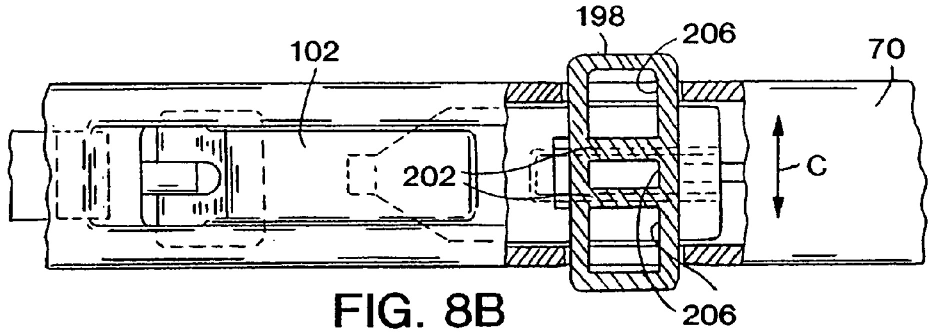
FIG. 8B is a view similar to that shown in FIG. 8A and illustrating the shuttle switch in a lateral position.
Figure 6:
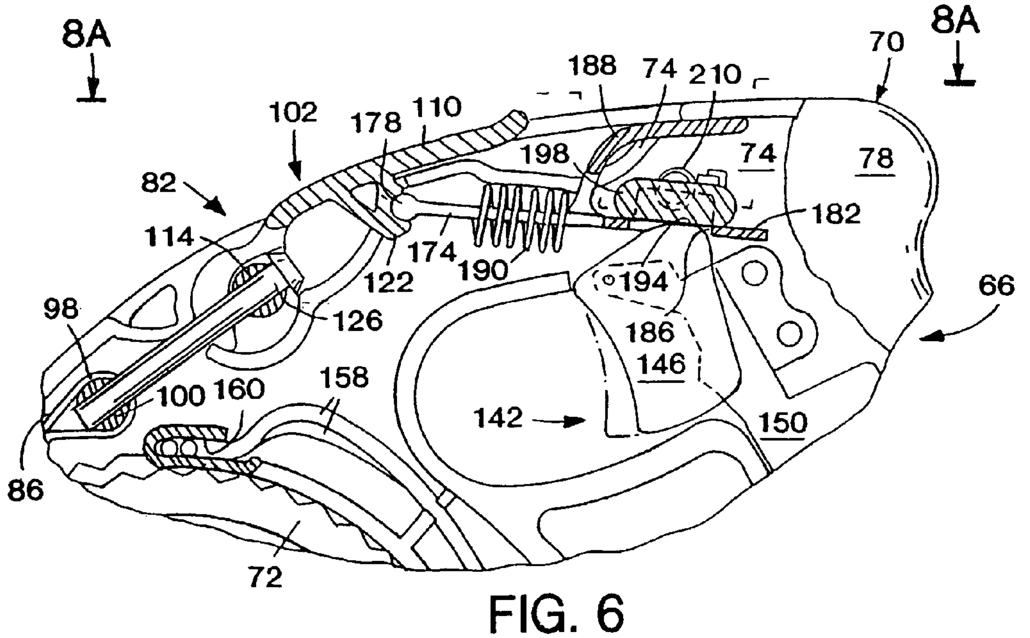
FIG. 6 is an enlarged partial cross-sectional view of a portion of the handle arrangement shown in FIG. 4.
Figure 7:
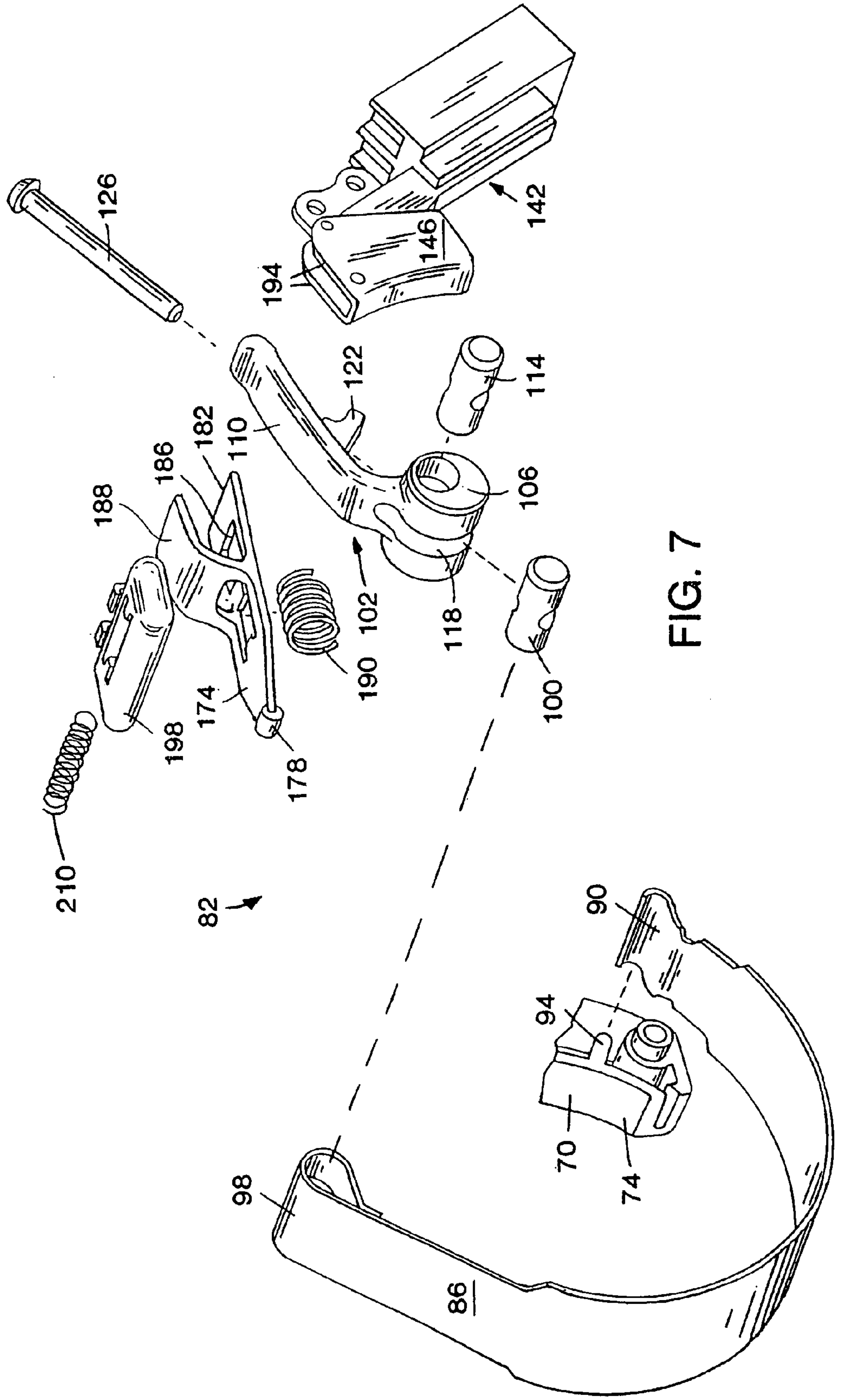
FIG. 7 is an exploded perspective view of a portion of the handle arrangement shown in FIG. 4.

In the illustrated construction, the switch assembly 142 also includes (see FIGS. 3-7, 8A and 8B) a shuttle switch 198 for further preventing unintentional operation of the trigger 146, thereby further preventing unintentional operation of the switch 150 and the motor 18. The shuttle switch 198 is supported for lateral movement (in the direction of arrow C in FIGS. 8A and 8B) by the handle member 70. The shuttle switch 198 includes (see FIGS. 8A and 8B) two ribs 202 and defines three pockets 206. A biasing member 210 (see FIG. 6) biases the shuttle switch 198 to a centered position (as shown in FIG. 8A).

With the shuttle switch 198 in the centered position (shown in FIG. 8A), the upper portion 194 of the trigger 146 contacts the ribs 202, preventing the switch 150 from connecting the motor 18 to the power source. To operate the switch 150, the shuttle switch 198 must first be moved laterally (in the direction of arrow C in FIGS. 8A and 8B) against the force of the biasing member 210. With the shuttle switch 198 in a lateral position (such as that shown in FIG. 8B), the upper portion 194 of the trigger 146 does not contact the ribs 202 but passes into the pockets 206 defined between the ribs 202. The trigger 146 can thus operate the switch 150 to connect the motor 18 to the power source. It should be understood that the shuttle switch 198 can also be to a lateral position opposite to that shown in FIG. 8B to allow movement of the trigger 146.

Movement of the shuttle switch 198 to a lateral position (such as that shown in FIG. 8B) does not affect operation of the trigger 146 when the locking assembly 82 is in the unlocked condition (as shown in FIG. 5). Further, with the locking assembly 82 in the locked condition, the shuttle switch 198 must also be moved to the position shown in FIGS. 4 and 8B to allow the trigger 146 to be operated.

Figure 2:
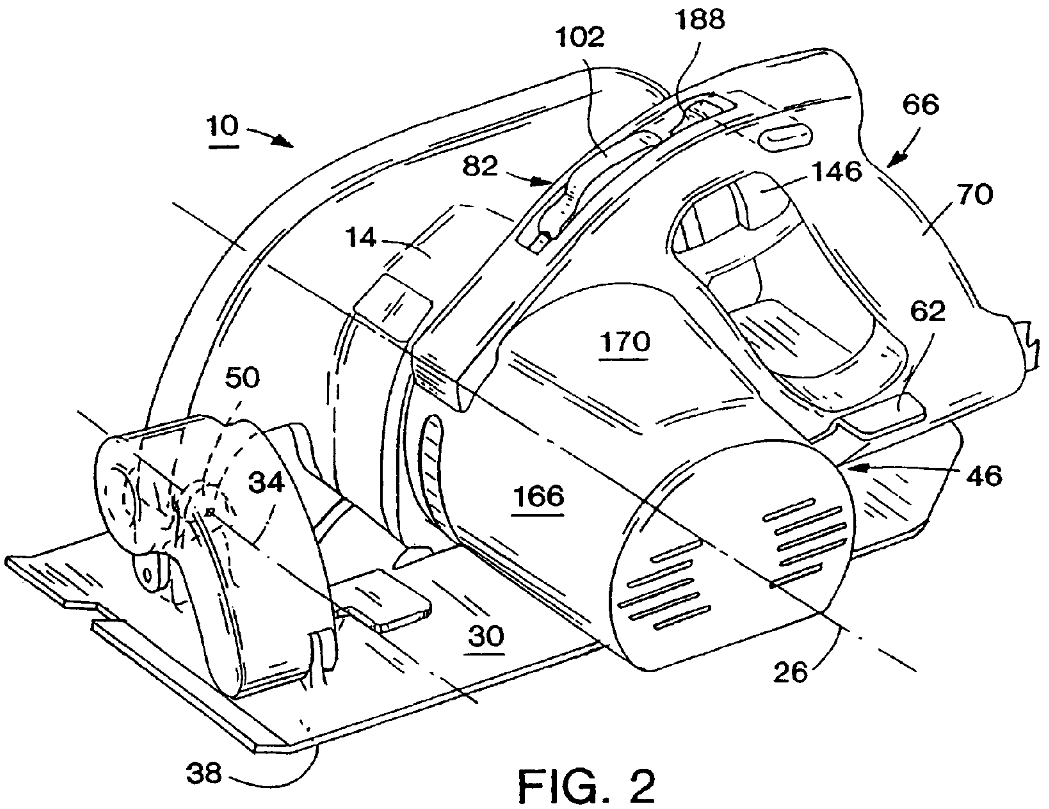
FIG. 2 is a perspective view of the power tool shown in FIGS. 1A-1C.

In operation, the operator selects the desired position of the handle member 70 relative to the housing 14 and ensures that the locking assembly 82 is in the locked condition as shown in FIGS. 1A, 2 and 4. The operator then operates the circular saw 10 to cut the workpiece W.

When the operator wants to change the position of the handle member 70 relative to the housing 14, for example, when the depth of cut of the saw blade 22 is adjusted, the operator first moves the switch assembly 142 to the unoperated condition by releasing the trigger 146.

The operator can then move the locking assembly 82 to the unlocked condition. The button 188 is depressed, and the actuating member 102 is moved to the unlocked position (as shown in FIG. 5) so that the locking member 86 does not apply a clamping force to the support portion 72 of the housing 14 and the inter-engaging teeth 130 are disengaged. The handle member 70 is then moved to the desired position relative to the housing 14, and the locking assembly 82 is moved to the locked condition. The locking member 86 applies the clamping force to the support portion 72 of the housing 14, and the inter-engaging teeth 130 are engaged. To continue cutting operations, the operator then moves the shuttle switch 198 to a lateral position (such as that shown in FIG. 8B), and depresses the trigger 146 to operate the motor 18 and cut the workpiece W.

As shown in FIGS. 1A-1C, the operator can adjust the handle member 70 after the depth of cut of the saw blade 22 has been adjusted to maintain a "push handle" orientation (illustrated in FIGS. 1A and 1C). The operator can also adjust the position of the handle member 70 to provide additional comfort to the operator. For example, if the operator is cutting a workpiece W that is positioned lower than the operator's waist, the operator might prefer a top handle position and may thus move the handle member 70 upwardly. Alternatively, in some cutting operations, the operator may prefer the "push handle" orientation to the "top handle" orientation. The operator can then move the handle member 70 from the higher "top handle" orientation to the lower "push handle" orientation.

One or more independent features and independent advantages of the invention are set forth in the following claims.

We claim:

1. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

operating the power tool with the handle in the first position;

positioning the handle in a second position, the second position being different than the first position;

engaging at least a portion of the second teeth with at least a portion of the first teeth when the handle is in the second position; and operating the power tool with the handle in the second position;

further comprising, after each position act, the act of applying a clamping force to one of the housing and the handle to hold the handle in a position;

wherein the power tool further includes clamping structure operable to selectively apply the clamping force to the one of the housing and the handle, and wherein each act of applying a clamping force includes the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of positioning the handle in a first position includes the act of positioning the second teeth in a first position relative to the first teeth, and wherein the act of positioning the handle in a second position includes the act of positioning the second teeth in a second position relative to the first teeth, the second position of the second teeth being different than the first position;

wherein the power tool includes a circular saw, wherein the tool element includes a saw blade, and wherein each act of operating the power tool includes the act of operating the circular saw to cut a work piece.

2. The method of claim 1, wherein the power tool further includes a support portion, and wherein each positioning act includes the act of positioning the handle in a position relative to the support portion.

3. The method of claim 1, wherein each positioning act includes the act of positioning the handle in a position relative to at least a portion of the housing.

4. The method of claim 3, wherein the housing includes a motor housing supporting the motor, and wherein each positioning act includes the act of positioning the handle in a position relative to the motor housing.

5. The method of claim 1, and further comprising, before each positioning act, the act of reducing the clamping force applied to the one of the housing and the handle to allow the handle to move from a position.

6. The method of claim 1, and further comprising, before each positioning act, the act of operating the actuator lever to move the clamping member to an unclamped condition, in which the clamping force is reduced to allow the handle to move from a position.

7. The method of claim 1, wherein the act of engaging at least a portion of the second teeth with at least a portion of the first teeth when the handle is in the first position includes the act of engaging a first portion of the first teeth with at least a portion of the second teeth, and wherein the act of engaging at least a portion of the second teeth with at least a portion of the first teeth when the handle is in the second position includes the act of engaging a second portion of the first teeth with at least a portion of the second teeth, the second portion of the first teeth being at least partially different than the first portion of the first teeth.

8. The method of claim 1, wherein the clamping structure further includes a pin, the pin being connected between the at least one clamping member and the actuator lever, and wherein each act of operating the actuator lever to cause the clamping structure to apply the clamping force to the one of the housing and the handle includes the act of operating the actuator lever to cause the pin to move the clamping member to a clamping condition, in which the clamping member applies the clamping force to the one of the housing and the handle to hold the handle in a position.

9. The method of claim 8, and further comprising the act of threadably engaging the pin with at least one of the at least one clamping member and the actuator lever.

10. The method of claim 1, wherein each act of operating the power tool includes operating the power tool while holding the handle.

11. The method of claim 1, wherein the act of engaging at least a portion of the second teeth with at least a portion of the first teeth when the handle is in the first position includes the act of not engaging a portion of the first teeth with the second teeth when the handle is in the first position.

12. The method of claim 11, wherein the act of engaging at least a portion of the second teeth with at least a portion of the first teeth when the handle is in the second position includes the act of not engaging a portion of the first teeth with the second teeth when the handle is in the second position.

13. The method of claim 1, wherein the handle is pivotable relative to an axis, wherein the handle extends in a plane generally perpendicular to the axis, and wherein the act of positioning the handle in a second position includes the act of pivoting the handle to the second position.

14. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

operating the power tool with the handle in the first position;

positioning the handle in a second position, the second position being different than the first position;

engaging at least a portion of the second teeth with at least a portion of the first teeth when the handle is in the second position; and operating the power tool with the handle in the second position;

further comprising, after each position act, the act of applying a clamping force to one of the housing and the handle to hold the handle in a position;

wherein the power tool further includes clamping structure operable to selectively apply the clamping force to the one of the housing and the handle, and wherein the method further comprises, after each positioning act, the each act of applying a clamping force including the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of positioning the handle in a first position includes the act of positioning the second teeth in a first position relative to the first teeth, and wherein the act of positioning the handle in a second position includes the act of positioning the second teeth in a second position relative to the first teeth, the second position of the second teeth being different than the first position;

wherein the at least one clamping member includes a clamping band, and wherein each act of operating the actuator lever to move the clamping member to a clamping condition includes the act of operating the actuator lever to move the clamping band to a clamping condition, in which the clamping band applies the clamping force to the one of the housing and the handle to hold the handle in a position.

15. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

applying a clamping force to one of the housing and the handle to hold the handle in the first position;

operating the power tool with the handle in the first position;

reducing the clamping force applied to the one of the housing and the handle to allow the handle to move from a position;

positioning the handle in a second position, the second position being different than the first position;

engaging at least a portion of the second teeth with at least a portion of the first teeth when the handle is in the second position;

applying a clamping force to one of the housing and the handle to hold the handle in the second position; and operating the power tool with the handle in the second position;

wherein the power tool further includes clamping structure operable to selectively apply the clamping force to the one of the housing and the handle, and wherein each act of applying a clamping force includes the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of engaging at least a portion of the second teeth with at least a portion of the first teeth when the handle is in the first position includes the act of engaging a first portion of the first teeth with at least a portion of the second teeth, and wherein the act of engaging at least a portion of the second teeth with at least a portion of the first teeth when the handle is in the second position includes the act of engaging a second portion of the first teeth with at least a portion of the second teeth, the second portion of the first teeth being at least partially different than the first portion of the first teeth;

wherein the power tool includes a circular saw, wherein the tool element includes a saw blade, and wherein each act of operating the power tool includes the act of operating the circular saw to cut a work piece.

16. The method of claim 15, wherein the act of reducing the clamping force applied to the one of the housing and the handle includes the act of operating the actuator lever to move the clamping member to an unclamped condition, in which the clamping force is reduced to allow the handle to move from the first position.

17. The method of claim 15, wherein the act of positioning the handle in a first position includes the act of positioning the second teeth in a first position relative to the first teeth, and wherein the act of positioning the handle in a second position includes the act of positioning the second teeth in a second position relative to the first teeth, the second position of the second teeth being different than the first position.

18. The method of claim 15, wherein the power tool further includes a support portion, and wherein each positioning act includes the act of positioning the handle in a position relative to the support portion.

19. The method of claim 15, wherein each positioning act includes the act of positioning the handle in a position relative to at least a portion of the housing.

20. The method of claim 19, wherein the housing includes a motor housing supporting the motor, and wherein each positioning act includes the act of positioning the handle in a position relative to the motor housing.

21. The method of claim 15, wherein the clamping structure further includes a pin, the pin being connected between the at least one clamping member and the actuator lever, and wherein each act of operating the actuator lever to cause the clamping structure to apply the clamping force to the one of the housing and the handle includes the act of operating the actuator lever to cause the pin to move the clamping member to a clamping condition, in which the clamping member applies the clamping force to the one of the housing and the handle to hold the handle in a position.

22. The method of claim 21, and further comprising the act of threadably engaging the pin with at least one of the at least one clamping member and the actuator lever.

23. The method of claim 15, wherein each act of operating the power tool includes operating the power tool while holding the handle.

24. The method of claim 15, wherein the act of engaging at least a portion of the second teeth with at least a portion of the first teeth when the handle is in the first position includes the act of not engaging a portion of the first teeth with the second teeth when the handle is in the first position.

25. The method of claim 24, wherein the act of engaging at least a portion of the second teeth with at least a portion of the first teeth when the handle is in the second position includes the act of not engaging a portion of the first teeth with the second teeth when the handle is in the second position.

26. The method of claim 15, wherein the handle is pivotable relative to an axis, wherein the handle extends in a plane generally perpendicular to the axis, and wherein the act of positioning the handle in a second position includes the act of pivoting the handle to the second position.

27. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

applying a clamping force to one of the housing and the handle to hold the handle in the first position;

operating the power tool with the handle in the first position;

reducing the clamping force applied to the one of the housing and the handle to allow the handle to move from a position;

positioning the handle in a second position, the second position being different than the first position;

engaging at least a portion of the second teeth with at least a portion of the first teeth when the handle is in the second position;

applying a clamping force to one of the housing and the handle to hold the handle in the second position; and operating the power tool with the handle in the second position;

wherein the power tool further includes clamping structure operable to selectively apply the clamping force to the one of the housing and the handle, and wherein each act of applying a clamping force includes the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of engaging at least a portion of the second teeth with at least a portion of the first teeth when the handle is in the first position includes the act of engaging a first portion of the first teeth with at least a portion of the second teeth, wherein the act of engaging at least a portion of the second teeth with at least a portion of the first teeth when the handle is in the second position includes the act of engaging a second portion of the first teeth with at least a portion of the second teeth, the second portion of the first teeth being at least partially different than the first portion of the first teeth;

wherein the at least one clamping member includes a clamping band, and wherein each act of operating the actuator lever to move the clamping member to a clamping condition includes the act of operating the actuator lever to move the clamping band to a clamping condition, in which the clamping band applies the clamping force to the one of the housing and the handle to hold the handle in a position.

28. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

operating the power tool with the handle in the first position;

positioning the handle in a second position, the second position being different than the first position;

engaging at least a portion of the second teeth with at least a portion of the first teeth when the handle is in the second position; and operating the power tool with the handle in the second position;

further comprising, after each position act, the act of applying a clamping force to one of the housing and the handle to hold the handle in a position;

wherein the power tool further includes clamping structure operable to selectively apply the clamping force to the one of the housing and the handle, and wherein each act of applying a clamping force includes the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of positioning the handle in a first position includes the act of positioning the second teeth in a first position relative to the first teeth, and wherein the act of positioning the handle in a second position includes the act of positioning the second teeth in a second position relative to the first teeth, the second position of the second teeth being different than the first position;

wherein the power tool includes a saw, wherein the tool element includes a saw blade, and wherein each act of operating the power tool includes the act of operating the saw to cause the saw blade to cut a work piece.

29. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

applying a clamping force to one of the housing and the handle to hold the handle in the first position;

operating the power tool with the handle in the first position;

reducing the clamping force applied to the one of the housing and the handle to allow the handle to move from a position;

positioning the handle in a second position, the second position being different than the first position;

engaging at least a portion of the second teeth with at least a portion of the first teeth when the handle is in the second position;

applying a clamping force to one of the housing and the handle to hold the handle in the second position; and operating the power tool with the handle in the second position;

wherein the power tool further includes clamping structure operable to selectively apply the clamping force to the one of the housing and the handle, and wherein each act of applying a clamping force includes the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of engaging at least a portion of the second teeth with at least a portion of the first teeth when the handle is in the first position includes the act of engaging a first portion of the first teeth with at least a portion of the second teeth, and wherein the act of engaging at least a portion of the second teeth with at least a portion of the first teeth when the handle is in the second position includes the act of engaging a second portion of the first teeth with at least a portion of the second teeth, the second portion of the first teeth being at least partially different than the first portion of the first teeth;

wherein the power tool includes a saw, wherein the tool element includes a saw blade, and wherein each act of operating the power tool includes the act of operating the saw to cause the saw blade to cut a work piece.

30. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

operating the power tool with the handle in the first position;

positioning the handle in a second position, the second position being different than the first position;

engaging at least a portion of the second teeth with at least a portion of the first teeth when the handle is in the second position; and operating the power tool with the handle in the second position;

further comprising, after each position act, the act of applying a clamping force to one of the housing and the handle to hold the handle in a position;

wherein the power tool further includes clamping structure operable to selectively apply the clamping force to the one of the housing and the handle, and wherein each act of applying a clamping force includes the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of positioning the handle in a first position includes the act of positioning the second teeth in a first position relative to the first teeth, and wherein the act of positioning the handle in a second position includes the act of positioning the second teeth in a second position relative to the first teeth, the second position of the second teeth being different than the first position;

wherein the power tool includes a saw, wherein the tool element includes a circular saw blade, and wherein each act of operating the power tool includes the act of operating the saw to cause the circular saw blade to cut a work piece.

31. A method of operating a power tool, the power tool including a housing, a motor operable to drive a tool element, a handle graspable by an operator to provide for movement of the tool element relative to a work piece, a plurality of first teeth, and a plurality of second teeth provided on the handle, the method comprising the acts of:

positioning the handle in a first position;

engaging at least a portion of the second teeth with at least a portion of the first teeth when the handle is in the first position;

applying a clamping force to one of the housing and the handle to hold the handle in the first position;

operating the power tool with the handle in the first position;

reducing the clamping force applied to the one of the housing and the handle to allow the handle to move from a position;

positioning the handle in a second position, the second position being different than the first position;

engaging at least a portion of the second teeth with at least a portion of the first teeth when the handle is in the second position;

applying a clamping force to one of the housing and the handle to hold the handle in the second position; and operating the power tool with the handle in the second position;

wherein the power tool further includes clamping structure operable to selectively apply the clamping force to the one of the housing and the handle, and wherein each act of applying a clamping force includes the act of applying a clamping force with the clamping structure to the one of the housing and the handle to hold the handle in a position;

wherein the clamping structure includes at least one clamping member operable to apply the clamping force, and an actuator lever operable to move the clamping member, and wherein each act of applying a clamping force with the clamping structure includes the act of operating the actuator lever to move the clamping member to a clamping condition, in which the clamping member applies the clamping force to the one of the housing and the handle to hold the handle in a position;

wherein the act of engaging at least a portion of the second teeth with at least a portion of the first teeth when the handle is in the first position includes the act of engaging a first portion of the first teeth with at least a portion of the second teeth, and wherein the act of engaging at least a portion of the second teeth with at least a portion of the first teeth when the handle is in the second position includes the act of engaging a second portion of the first teeth with at least a portion of the second teeth, the second portion of the first teeth being at least partially different than the first portion of the first teeth;

wherein the power tool includes a saw, wherein the tool element includes a circular saw blade, and wherein each act of operating the power tool includes the act of operating the saw to cause the circular saw blade to cut a work piece.

* * * * *